United States Patent [19]

Kulka et al.

[11] 4,415,842
[45] Nov. 15, 1983

[54] TELEVISION RECEIVER START-UP CIRCUIT

[75] Inventors: Raymond J. Kulka, Chicago; William A. Trzyna, Elgin, both of Ill.

[73] Assignee: Zenith Radio Corporation, Gleview, Ill.

[21] Appl. No.: 407,418

[22] Filed: Aug. 12, 1982

[51] Int. Cl.³ ............................................. H01J 29/70
[52] U.S. Cl. ..................................... 315/411; 358/190
[58] Field of Search ................. 315/411, 408; 358/190

[56] References Cited

U.S. PATENT DOCUMENTS

| | | | |
|---|---|---|---|
| 3,621,134 | 12/1971 | Waring | 178/7.3 R |
| 3,814,851 | 6/1974 | Nakagawa et al. | 178/7.3 R |
| 3,947,632 | 3/1976 | Giger et al. | 178/7.5 |
| 4,112,465 | 9/1978 | Willis | 358/190 |
| 4,127,875 | 12/1978 | Fernsler et al. | 358/190 |
| 4,188,641 | 2/1980 | Baker et al. | 358/190 |
| 4,240,013 | 12/1980 | Wedam | 315/411 |
| 4,246,634 | 1/1981 | Purol | 363/49 |

Primary Examiner—Theodore M. Blum

[57] ABSTRACT

A television receiver start-up circuit wherein the conventional start-up transformer is eliminated by initiating horizontal output circuit operation directly from the unregulated B+ driven horizontal driver transformer is disclosed. An astable multivibrator energized by the line referenced unregulated B+ power supply provides a pulsed output to the horizontal driver transformer for initiating oscillation of the horizontal output transistor in initiating television receiver sweep operation. Multivibrator operation is timed out following application of the unregulated B+ thereto for termination of the start-up signal and operation of the horizontal drive circuitry by the television receiver's line isolated power supply in sustaining television receiver operation.

8 Claims, 3 Drawing Figures

TELEVISION RECEIVER START-UP CIRCUIT

BACKGROUND OF THE INVENTION

This invention relates generally to television receivers, and is particularly directed to a system for initiating operation of a television receiver.

In a conventional television receiver rectified AC line voltage is filtered to provide line referenced and line isolated D.C. B+ operating voltages. The line reference B+ voltage is used to, among other things, develop the electron accelerating potential in the television receiver's cathode ray tube, regulate electron beam intensity, and drive horizontal and vertical electron beam deflection circuitry. The line isolated B+ voltage is used to energize the television receiver's video, chrominance and tuner circuits as well as to provide a voltage supply for horizontal and vertical deflection control circuitry.

Included in the horizontal deflection control circuitry is a horizontal oscillator which provides switching signals to an electron beam trace control circuit of the horizontal deflection system for developing scanning current in a horizontal deflection winding. After the elapse of a start-up interval, rectified retrace pulses provide an energizing line isolated B+ voltage to the horizontal oscillator. A secondary winding of a horizontal output transformer is generally used to derive the line isolated B+ voltage after operation of the horizontal deflection circuit has been initiated. However, until the horizontal oscillator circuit begins oscillation, a line isolated voltage alternating current is not available from the flyback transformer. Thus an initial pulse of current is necessary to start the oscillator circuit which then causes the horizontal output circuit to generate the alternating current in an extra winding in the flyback transformer.

One approach to providing the initial pulse of current for initiating horizontal oscillator operation involves the use of a start-up transformer energized by the common power supply of the television receiver for delivering a start-up pulse to the horizontal oscillator for initiating the operation thereof. When the television receiver is turned on, an initial period occurs in which inrush current flow into an uncharged filter capacitor. The start-up circuit includes a winding coupled magnetically to an inductor in the path of the inruch current. This winding develops an alternating current potential during this initial period, which is rectified to provide a line referenced B+ start-up operating voltage for various television receiver systems including the horizontal deflection circuit. One example of this type of television start-up circuit is described in U.S. Pat. No. 4,127,875 to Fernsler et al. U.S. Pat. No. 4,112,465 to Willis describes an improvement in the aforementioned approach involving the decoupling of the alternating current potential developed in the start-up transformer from the television receiver circuits for the entirety of the steady state interval in order to eliminate unwanted modulation of the raster when the start-up alternating potential is provided to the horizontal deflection circuit after initial television receiver turn-on. Other examples of a start-up power supply for a television receiver utilizing a start-up transformer or winding can be found in U.S. Pat. Nos. 3,947,632 to Giger et al. and 4,188,641 to Baker et al.

Another approach to providing an initial pulse of current to start the television receiver oscillator circuit in initiating the operation thereof involves the use of a capacitor voltage divider network, sometimes referred to as a "kick" circuit for generating a surge voltage from the common power supply of the television receiver. This surge voltage is applied to the horizontal oscillator to cause it to begin oscillation and thereafter the rectified voltage derived from the television receiver's flyback transformer provides the necessary operating voltage for continued horizontal oscillator operation. Examples of television receiver start-up systems employing a condenser voltage divider network are provided in U.S. Pat. No. 3,814,851 to Nakagawa et al. and No. 3,621,134 to Waring.

U.S. Pat. No. 4,246,634 to Purol discloses a switched mode power supply start-up circuit in which an oscillating switching circuit is connected in series with a transformer and a direct current source so as to chop the direct current source in energizing the transformer. Power for starting the oscillator, which requires a substantially lower voltage than that of the rectified source, is derived from a capacitor charged by the direct current source. U.S. Pat. No. 4,240,013 to Wedam discloses a start-up arrangement including a transistorized push-pull output switching stage comprised primarily of an astable multivibrator which is made self-oscillatory upon engagement of the ON switch. After the initial start-up interval, when a sufficient voltage has been developed to permit sustained horizontal oscillator and driver operation, the push-pull output switching stage ceases to self-oscillate with the horizontal oscillator then energized by a low voltage DC power supply in a conventional manner.

All of the systems described above require components dedicated solely to power supply start-up and which cease to function following stable power supply operation. Such dedicated components performing a specialized, limited function increase the cost and complexity of the power supply. The present invention, however, provides a power supply start-up system particularly adapted for use in a conventional television receiver which employs a minimum number of components limited to the specific task of power supply, or television receiver, start-up.

OBJECTS OF THE INVENTION

Accordingly, it is an object of the present invention to provide an improved television receiver start-up system.

It is another object of the present invention to eliminate the requirement of a start-up transformer in a television receiver.

Still another object of the present invention is to initiate operation of a television receiver directly from its unregulated B+ supply using the television receiver's horizontal driver transformer.

A further object of the present invention is to provide a television receiver start-up system activated upon application of a B+ voltage therein and which automatically turns-off once normal television receiver operation is attained.

A still further object of the present invention is to provide an improved start-up circuit for a switched mode power supply wherein the start-up circuit is turned off once stable power supply operation is achieved.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENTS

Figure 1:
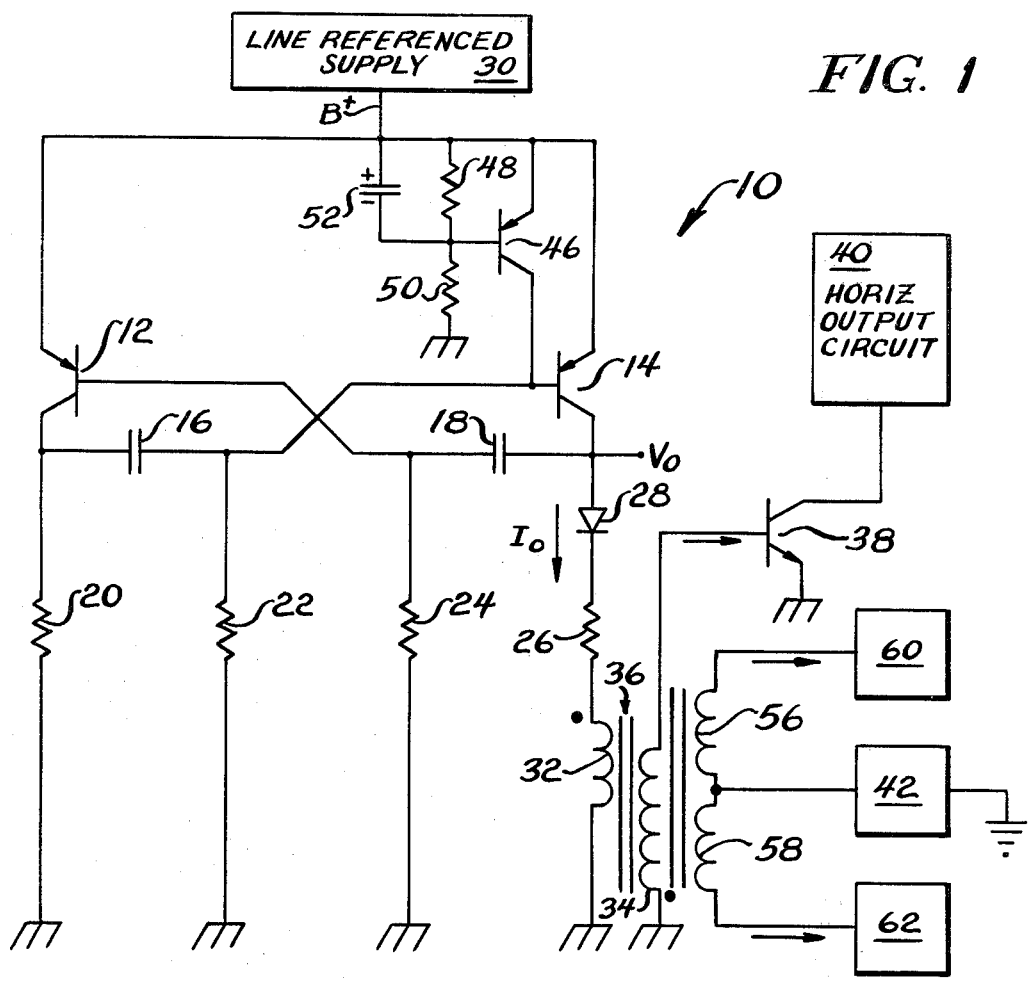
FIG. 1 is a schematic diagram of a television receiver start-up circuit in accordance with a preferred embodiment of the present invention.

Referring to FIG. 1, there is shown in combination block and schematic diagram form a start-up circuit 10 for an isolated, switched mode power supply particularly adapted for use in a conventional television receiver.

The start-up circuit 10 is energized by the unregulated B+ output of a line referenced voltage supply 30. Following television receiver start-up, the operation of the start-up circuit 10 is timed-out in a manner to be explained with continued television receiver operation provided for by a line isolated voltage supply 42. Typically a line referenced voltage of approximately 150 VDC is provided for television receiver start-up, while sustained television receiver operation is provided for by approximately 25 VDC from the line isolated voltage supply 42.

The start-up circuit 10 includes an astable multivibrator which is comprised primarily of PNP transistors 12, 14. The output of the line referenced voltage supply 30, which is an unregulated B+ voltage, is provided to the respective emitters of PNP transistors 12, 14. Astable multivibrator oscillation is initiated upon the application of the unregulated B+ voltage to the PNP transistors 12, 14 due to the inherent difference in the current gain ($\beta$-value) of these semiconductors. Application of the line referenced voltage to the respective emitters of PNP transistors 12, 14 in combination with the difference in their respective $\beta$-values results in the turn-on of either transistor 12 or transistor 14. The turn-on of transistor 12 causes the charging of capacitor 16, while the turn-on of transistor 14 causes capacitor 18 to become charged.

Transistor 12 will conduct until capacitor 16 is fully charged, whereupon the discharge of capacitor 16 will render transistor 14 conductive. Similarly, transistor 14 will initially conduct until capacitor 18 is fully charged whereupon capacitor 18 discharges rendering transistor 12 conductive. When capacitor 16 discharges, transistor 14 is rendered conductive and transistor 12 ceases to conduct. Similarly, when capacitor 18 discharges, transistor 12 is rendered conductive while transistor 14 is rendered nonconductive. Thus, oscillation of the astable multivibrator is accomplished by the rapidly alternating conduction of PNP transistors 12, 14 with the alternating conductive periods of transistors 12, 14 defined by the values of resistors 22, 24 and capacitors 16, 18. The RC time constants thus established by resistors 22, 24 and capacitors 16, 18 determine the periods of conduction and nonconduction of transistors 12, 14 and therefore the oscillating frequency of the astable multivibrator.

Figure 2A:
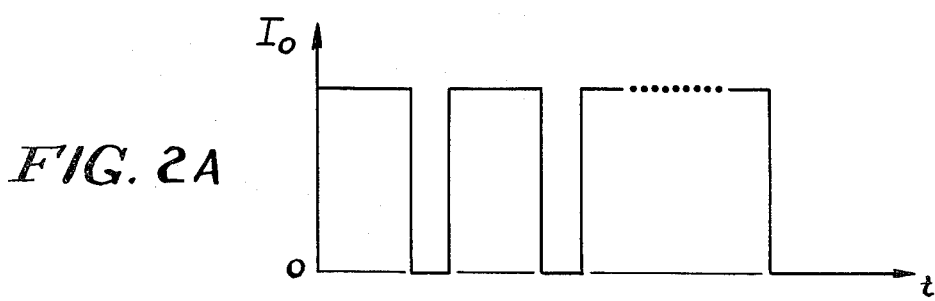
FIGS. 2A and 2B illustrate the current and voltage waveforms, respectively, provided to the horizontal driver transformer by the television receiver start-up circuit of the present invention.
Figure 2B:
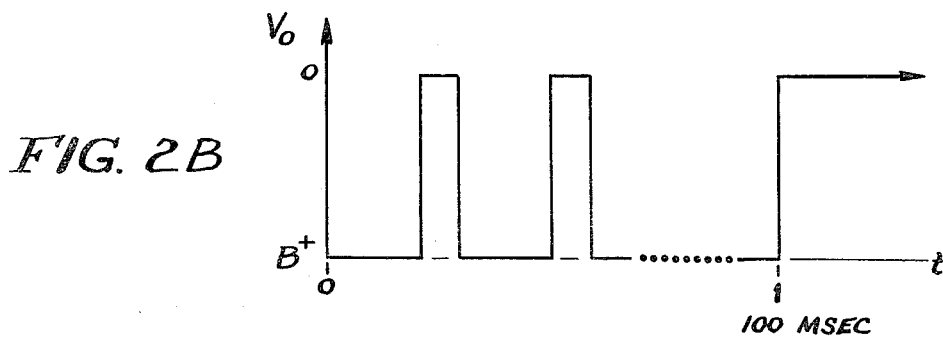

A pulsed output current $I_o$ is provided by the multivibrator at the collector of transistor 14 as shown in FIG. 2A. The output current varies from 0 to a value $I_0$. Thus, an output pulse is provided to the cathode of diode 28 when transistor 14 is conductive, causing a voltage $V_o$ to be established across resistor 26 as shown in FIG. 2B. Because the current rather than the voltage provided from the collector of transistor 14 to horizontal driver transformer 36 is what is of interest in the start-up circuit 10 of the present invention, the value of grounded resistor 20 coupled to the collector of transistor 12 is selected to be large with respect to the value of resistor 26. In a preferred embodiment, $I_o$ is approximately 100 milliamps, with resistor 26 being a flameproof low power resistor which conducts only for short periods and has a value of 2 kilohms. Resistor 20 is assigned a value of 100 kilohms.

The pulsed output current from the collector of transistor 14 is provided to a first primary winding 32 of the horizontal driver transformer 36. Diode 28 is inserted between transistor 14 and the horizontal driver transformer 36 to perform a blocking function in precluding the reflection of current back into the astable multivibrator circuit comprised primarily of transistors 12, 14 from the horizontal drive transformer 36 during normal television receiver operation. A pulsed signal provided from the horizontal driver transformer 36 to the aforementioned astable multivibrator could start this circuit oscillating and turn-on the start-up circuit 10 of the present invention once stable television receiver operation has been attained following initial start-up. Thus, diode 28 insures that the start-up circuit remains off once it is deactivated following initial television receiver start-up.

Inductively coupled to the first primary winding 32 of the horizontal driver transformer 36 is a secondary winding 34 wound in the opposite direction with respect thereto. Thus, the positive pulses of the current I provided to the first primary winding 32 cause a series of negative current pulses to be inductively generated in the secondary winding 34. The negative current pulses are then provided from the secondary winding 34 to the base of NPN horizontal output transistor 38. The pulsed current provided to the base of the horizontal output transistor 38 initiates its oscillation and causes a pulsed output to be provided to the horizontal output circuit 40. The horizontal output circuit 40, in turn, energizes the horizontal and vertical sweep circuitry (not shown) causing the required sawtooth-shaped sweep signals to be generated in accomplishing electron beam sweep of the cathode ray tube's faceplate (not shown) during television receiver start-up.

Following television receiver start-up, a line isolated voltage supply 42 provides approximately a 25 VDC input to second and third primary windings 56, 58 of the horizontal driver transformer 36. The second and third primary windings 56, 58 are inductively coupled to secondary winding 34 and respectively energize forward and reverse driver circuits 60, 62. The forward and reverse driver circuits 60, 62, in turn, sequentially drive the horizontal output transistor 38 via the inductive coupling between second and third primary windings 56, 58 and secondary winding 34 to sustain horizontal output circuit 40 operation following initial start-up. The pulsed output of the horizontal output transistor 38 is then provided as previously described to the horizontal output circuit 40 for accomplishing CRT sweep. Thus, following initial television receiver start-up, the line isolated voltage supply 42 sustains receiver operation, with the start-up circuit 10 of the present invention turned-off in the following manner.

When the television receiver is initially turned on the unregulated line referenced B+ is provided to transistors 12, 14, the base and emitter of PNP transistor 46 are essentially shorted together causing capacitor 52 to become charged. When the charge on capacitor 52 reaches 0.7 volts, transistor 46 turns on and shorts the base-emitter junction of transistor 14. This causes the collector-emitter junction of transistor 14 to open and terminates the oscillation of the astable multivibrator comprised primarily of transistors 12, 14. Resistors 48, 50 form a voltage dividing network for limiting the voltage applied across capacitor 52 and for providing proper voltage biasing for the turn-on of transistor 46. When transistor 14 is rendered nonconductive and the astable multivibrator ceases to oscillate, transistor 12 will remain conductive with a small current being provided to ground via resistor 20. By selecting the value of resistor 20 to be large enough (100 kilohms), the current from the high voltage supply 30 may be primarily used to charge up capacitor 52 so as to maintain transistor 46 conductive resulting in the turn-off of transistor 14 as previously described. In a preferred embodiment, the values of resistors 48, 50 and capacitor 52 are selected to result in the turn-on of transistor 46 approximately 100 milliseconds after the line referenced voltage supply output is provided to transistors 12, 14. Thus, the start-up circuit 10 of the present invention is permitted to operate for approximately 100 milliseconds before it is shut down with sustained power supply operation provided by line isolated voltage supply 42. With the start-up circuit 10 of the present invention turned off following initial television receiver start-up, continued television receiver operation in terms of the driving of the horizontal output transistor 38 is provided by the line isolated DC voltage supply 42.

The following values are assigned to the various components in the start-up circuit 10 in a preferred embodiment of the present invention:

| Component | Preferred Value |
|---|---|
| Capacitor 16 | 0.0082 microfarads |
| Capacitor 18 | 220 picofarads |
| Resistor 20 | 100 kilohms |
| Resistor 22 | 62 kilohms |
| Resistor 24 | 1 megohm |
| Resistor 26 | 2 kilohms |
| Resistor 48 | 680 ohms |
| Resistor 50 | 150 kilohms |
| Capacitor 52 | 470 microfarads |

There has thus been described a start-up circuit for an isolated, switched mode power supply particularly adapted for use in a conventional television receiver which eliminates the requirement for a start-up transformer. The present invention provides for the start-up of the horizontal output transistor and horizontal output circuitry directly from the unregulated, line referenced power supply, with start-up circuit operation automatically terminated once stable television receiver operation is attained and sustained by a line isolated power supply.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In an isolated, switched mode power supply for driving a DC load, said power supply including a line referenced voltage source and a line isolated voltage source, a transformer having first and second primary windings wherein said second primary winding is coupled to and energized by said line isolated voltage source, a start-up circuit comprising:

oscillating means coupled to and energized by said line referenced voltage source for providing a pulsed output current in response thereto said first primary winding;

a secondary winding of said transformer inductively coupled to said first and second primary windings and responsive to pulsed signals therein for respectively generating a start-up signal and a drive signal in response thereto;

switch means coupled to said DC load and to said secondary winding and responsive to said start-up signal output therefrom for initially driving said DC load when said oscillating means is initially energized and subsequently responsive to said drive signal for continuing to drive said DC load; and timing means coupled to said line referenced voltage source and said oscillating means for terminating the oscillation thereof after a predetermined time interval whereupon said start-up signal is no longer provided to said switch means with continued power supply operation sustained by said line isolated voltage source.

2. A start-up circuit in accordance with claim 1 wherein said oscillating means includes an astable multivibrator for providing said pulsed output current to said first primary winding.

3. A start-up circuit in accordance with claim 2 wherein said astable multivibrator includes first and second transistor means alternately rendered conductive by said line referenced voltage source for sequentially providing said pulsed output current to said first primary winding.

4. A start-up circuit in accordance with claim 3 wherein said timing means includes a resistive-capacitive network in combination with third transistor means with said third transistor means coupled to said second transistor means and rendered conductive following the elapse of a predetermined time interval established by said resistive-capacitive network following turn-on of said power supply for opening said second transistor means in terminating the oscillation of said astable multivibrator.

5. A start-up circuit in accordance with claim 4 further including unidirectional conducting means coupled between said astable multivibrator and said first winding whereby signals induced in said transformer by said switch means are electrically isolated from said astable multivibrator following the start-up of said power supply.

6. A star-up circuit in accordance with claim 1 wherein said power supply is employed in a television receiver having a cathode ray tube swept by an electron beam and whereby said line referenced voltage source provides an unregulated B+ voltage to said oscillating means with said primary and secondary windings included in a horizontal driver transformer of said television receiver and said switch means comprises a horizontal output transistor for energizing a horizontal output circuit therein.

7. A start-up circuit in accordance with claim 6 wherein said second primary winding includes first and second portions thereof respectively coupling said line isolated voltage source to forward and reverse driver circuits with said forward and reverse driver circuits sequentially driving said horizontal output transistor for accomplishing electron beam sweep of said cathode ray tube in said television receiver.

8. In a television receiver including a B+ line referenced voltage source and a line isolated voltage source, a horizontal driver transformer coupled to said line isolated voltage source for providing a pulsed output to a horizontal output transistor coupled to a horizontal output circuit for the operation thereof during normal television receiver operation following an initial start-up interval, a television receiver start-up circuit comprising:

a pulse generating oscillator coupling said line referenced voltage source to said horizontal driver transformer for generating a start-up signal and providing said start-up signal directly to said horizontal driver transformer whereby said horizontal output transistor initiates the operation of said horizontal output circuit in response thereto; and circuit means coupled to said pulse generating oscillator for terminating said start-up signal output therefrom following an initial interval after television receiver turn-on whereby said pulse generating oscillator is turned-off with normal television receiver operation sustained by said line isolated voltage source.

* * * * *